Oct. 4, 1932.   P. B. FLANDERS   1,880,425
MEASUREMENT OF MECHANICAL IMPEDANCE
Filed Nov. 27, 1931
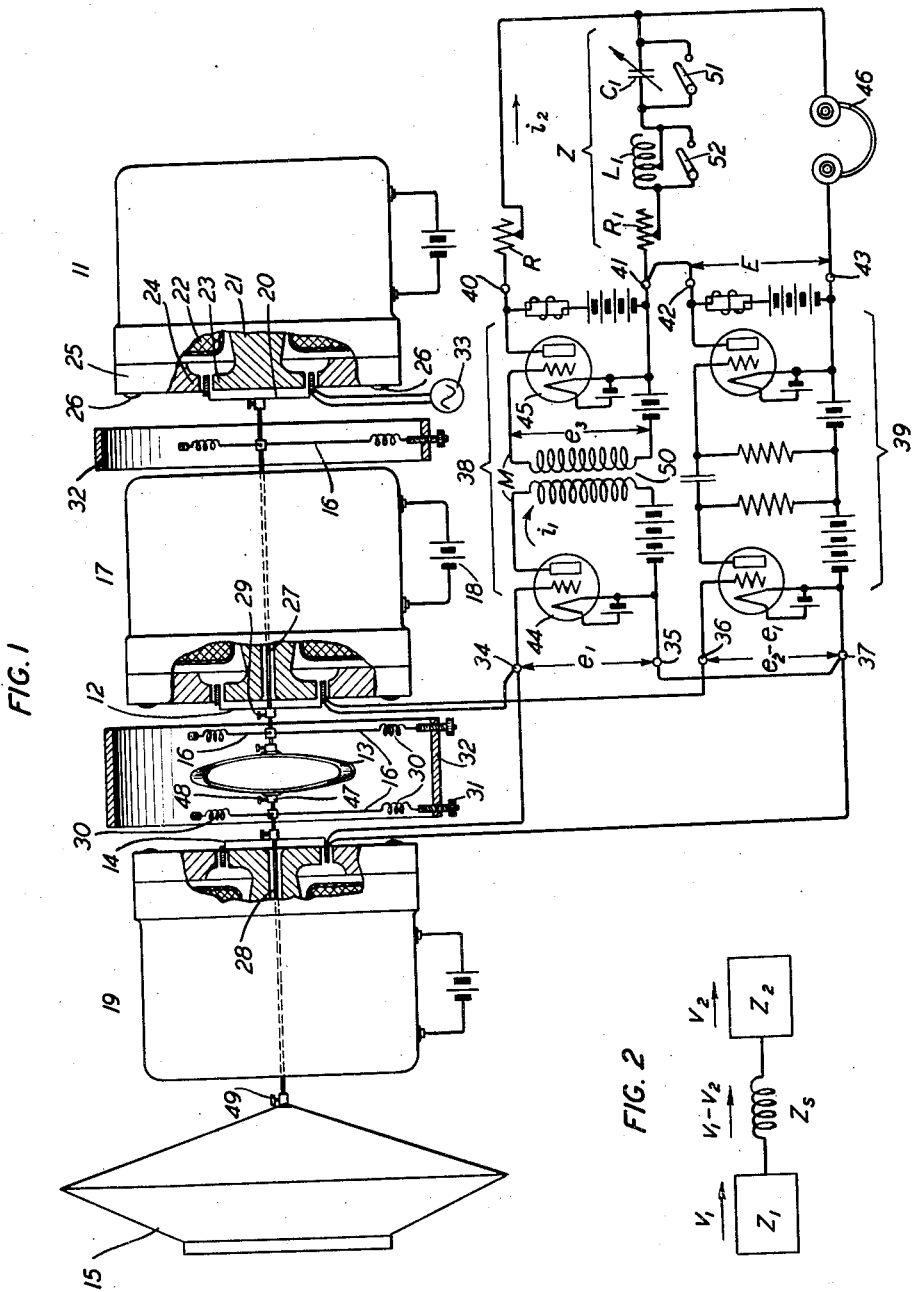
INVENTOR
P.B. FLANDERS
BY
G. H. Stevenson
ATTORNEY Patented Oct. 4, 1932

1,880,425

UNITED STATES PATENT OFFICE

PAUL B. FLANDERS, OF EAST ORANGE, NEW JERSEY, ASSIGNOR TO BELL TELEPHONE LABORATORIES, INCORPORATED, OF NEW YORK, N. Y., A CORPORATION OF NEW YORK

MEASUREMENT OF MECHANICAL IMPEDANCE

Application filed November 27, 1931. Serial No. 577,679.

This invention relates to the measurement of mechanical impedance and more particularly to means for measuring the mechanical impedance of a vibrating system at specified frequencies in a wide frequency range.

Its principal object is to facilitate the making of such measurements by providing an arrangement in which the measured mechanical impedance may be obtained directly from the setting of electrical impedance standards.

In accordance with the invention, the mechanical device to be measured is coupled to a driving source having a vibratory motion, the coupling being effected by a mechanical element of known impedance such as a spring, which can act as a mechanical shunt to the driven device and, in effect, absorb some of the impressed motion.

By comparing the velocity of the device under test with the difference between this velocity and that of the driving source, the unknown mechanical impedance can be determined in terms of the impedance of the coupling element. The comparison of the velocities is effected by inducing electromotive forces proportional to the velocities of the two mechanical elements and applying these electromotive forces to an electrical circuit in such manner that one, corresponding to the velocity of the driven device, is balanced against the difference of the two. The electromotive force may be induced by any suitable means, but preferably by the use of coils attached to the respective elements and disposed in properly oriented magnetic fields.

Referring to the drawing:

Fig. 1 shows an embodiment of the invention in an apparatus for measuring the mechanical impedance of a vibrating system; and Fig. 2 is a schematic diagram of the moving system of Fig. 1.

Before proceeding to describe the embodiment of the invention shown in Fig. 1 the nature of mechanical impedance will be considered and the terms used will be defined. The term mechanical impedance as here used is defined as the ratio of a simple harmonic vibratory force to the resulting velocity of the body to which the force is applied. The conception of mechanical impedance is found to be of advantage in dealing with certain problems arising in connection with mechanical systems which are in a state of vibration, the velocity and the amplitude of the vibration being obtainable immediately when the applied force and the mechanical impedance are known. In general, the reaction of a mechanical system against an impressed vibratory force of sinusoidal variation may be resolved into two components, one in phase with the velocity and representing a consumption of energy, and one in quadrature with the velocity representing a periodic storage and discharge of energy. The resultant reaction is equal numerically to the velocity multiplied by the mechanical impedance, the energy dissipative component of which is termed mechanical resistance and non-dissipative component of which is termed mechanical reactance.

If a vibratory force is applied to a simple mass element, assumed free from external restraints, the motion of the body is resisted only by its inertia. The body undergoes a vibration synchronous with the force and of such amplitude that the alternating inertia reactions just balance the applied force. The impedance is directly proportional to the frequency, and since there is no energy dissipation it is purely reactive. The value of the impedance of a body of $m$ grams is equivalent to $j\omega m$ c. g. s. units where $\omega = 2\pi$ times the frequency, and $j$ is the usual complex operator indicating that the value is imaginary.

When a vibratory force is applied to a spring the force is balanced at all instants by the elastic restoring force due to the displacement of the point of application. The amplitude corresponding to a constant force is the same at all frequencies, and hence the vibrational velocity increases in direct proportion to the frequency. Defining the elasticity as the ratio of the total force to the linear displacement at the point of application and denoting this quantity by $s$, the impedance of an elastic element is equal to $$-j\frac{s}{\omega}$$

This elastic reactance, like mass reactance, develops forces that are non-dissipative. The work done is alternatively stored and released without being permitted to leave the system. The counter forces of mass reactance and elastic reactance are in mutual phase opposition, so that the forces to which they give rise tend to cancel each other.

The resistive component of mechanical impedance may be made up of friction of one kind or another which absorbs and dissipates the mechanical energy in the form of heat, or it may, in acoustical apparatus, be represented by the energy consumed in setting up sound waves in the surrounding medium, usually air.

In the measuring apparatus shown in Fig. 1 the moving system comprises a floating coil 20 of a driving motor 11 coupled by a shaft 27 to a spring 13 to which a load 15, representing the device being tested, is coupled by a shaft 28. The moving coil 20 of motor 11 is positioned in the magnetic field of an electro-magnet having a core 21, a winding 22 and pole pieces 23 and 24. The top portion 25 of magnetic core 21 is detachable to permit the assembling of winding 22 on the core structure, and is secured to the lower portion of the core by screws 26. The electromotive force for operating motor 11 is furnished by an oscillator 33 which provides a sine wave alternating voltage, the frequency of which can be set as required in making measurements at different frequencies. Coupling spring 13 is a continuous flat band of spring metal formed into an oval and provided with two bosses 47 drilled to fit over the ends of shafts 27 and 28 and held in place by two set screws 48. The device 15 under measurement is shown as a loud speaker which is securely attached to shaft 28 by a set screw 49. The moving system is supported from frames 32 at three places and kept in alignment by a group of three-point suspensions, comprising wires 16 and springs 30, the tensions of which can be adjusted by tensioning screws 31 which screw into tapped holes drilled in the frames. These frames may in turn be mounted on a common base, not shown, which also supports the magnets 11, 17 and 19.

The velocity measuring apparatus comprises two coils 12 and 14 rigidly attached, respectively, to shafts 27 and 28. Each of the coils is wound on a light frame at the center of which is a boss drilled to fit over shaft 27 or 28 and provided with a set screw 29 for holding the coil in place on the shaft. Coils 12 and 14 are positioned, respectively, in the fields of electromagnets 17 and 19 which are similar to the electromagnet used in motor 11 except that the cores are hollow to allow the passage therethrough of shafts 27 and 28.

The circuits for the comparison of the generated electromagnetic forces comprise two vacuum tube amplifiers 38 and 39 having separate input terminals and having their output terminals connected to a common adjustable impedance Z. Amplifier 39 has two stages, resistance coupled, and is designed so as to give an output electromotive force in phase with the input electromotive force and having a linear relation thereto which is substantially independent of frequency variations. Its output circuit includes, in addition to the common impedance Z, a telephone 46 which serves as a means of observing a balanced condition. Amplifier 39 also has two tubes 44 and 45, but in this case the coupling between the stages is through a transformer 50 having relatively low impedance windings. The output circuits of each stage of amplifier 38 should be so proportioned that the external impedance is negligibly small compared with the internal plate circuit impedance of the tube. In the output of tube 45 an adjustable high resistance R is provided which supplements the internal tube impedance and which may be made large enough to render unnoticeable the effect of variations of the common impedance Z. If desired, a similar resistance may be added in series with tube 44.

Across the input terminals 34 and 35 of amplifier 38 is impressed the electromotive force $e_1$ generated in coil 14, which is proportional to the driven velocity, the velocity of load 15. Coils 12 and 14 are connected in series and so poled that the difference between the two electromotive forces induced in the coils is available and this difference is impressed upon the input terminals 36 and 37 of amplifier 39.

The theory and manner of operation of the apparatus will now be considered in more detail. The moving system is represented diagrammatically by Fig. 2, in which $Z_s$ represents the impedance of spring 13, $Z_1$ represents the impedance of the driven side including load 15 and $Z_2$ represents the impedance of the driving side of the moving system. $Z_1$ is moving with an instantaneous velocity $v_1$ and $Z_2$ with a velocity $v_2$. The instantaneous velocity of $Z_s$, that is, the velocity of compression of the spring, is the difference of these velocities, $v_1 - v_2$. The force exerted by $Z_s$ upon $Z_1$ is equal to but opposite in direction to the force exerted by $Z_1$ upon $Z_s$ and, therefore, we may write $$v_1 Z_1 + (v_1 - v_2) Z_s = 0$$

or $$v_1 Z_1 = (v_2 - v_1) Z_s$$

from which $$Z_1 = \frac{v_2 - v_1}{v_1} Z_s \quad (1)$$

This equation gives the total impedance driven by the spring in terms of the spring impedance and of the velocity, the impedance of the driving mechanism being eliminated.

Referring again to Fig. 1 the voltage $e_1$ generated in coil 14 is proportional to velocity $v_1$ and, since amplifier 38 has a practically infinite input impedance, the full voltage generated is impressed upon the amplifier terminals 34 and 35. The input electromotive force of amplifier 38 is therefore given by $$e_1 = k_1 v_1 \quad (2)$$

where $k_1$ is a constant. Since the plate circuit impedance $r_p$ of tube 44 is high compared to the impedance of the coupling transformer 50, the plate current $i_1$ of tube 44 is given by the equation $$i_1 = \frac{k_2 e_1}{r_p} = \frac{k_1 k_2 v_1}{r_p} \quad (3)$$

where $k_2$ is the amplification constant of tube 44.

The voltage $e_3$ on the grid of the second-stage tube 45 is $$e_3 = i_1 j\omega M$$

where M is the mutual inductance of transformer 50, or, in terms of $v_1$ $$e_3 = \frac{k_1 k_2 j\omega M v_1}{r_p} \quad (4)$$

The plate current $i_2$ of tube 45 is $$i_2 = \frac{k_3 e_3}{R + r_{p2}} = \frac{k_1 k_2 k_3 j\omega M v_1}{r_p (R + r_{p2})} \quad (5)$$

where $k_3$ is the amplification constant of tube 45 and $r_{p2}$ is the internal resistance of tube 45.

The difference $e_2 - e_1$ of the electromotive forces induced in coils 12 and 14 is impressed on the input terminals 36 and 37 of the second amplifier 39. If the number of turns on coils 12 and 14 and the field strengths of electromagnets 17 and 19 are properly chosen, the voltage $e_2$ induced in coil 12 can be expressed as $$e_2 = k_1 v_2 \quad (6)$$

By equalizing the constants of the two coils a voltage is readily obtained which is directly proportional to the difference of the velocities $v_1$ and $v_2$. The output voltage E at terminals 42 and 43 of amplifier 39 is then $$E = k_4 (e_2 - e_1) \quad (7)$$

where $k_4$ is the amplification constant of amplifier 39. Substituting for $e_1$ and $e_2$ the values from Equations (2) and (6)

$$E = k_1 k_4 (v_2 - v_1) \quad (8)$$

If, now, the impedance Z is varied until no tone is heard in receiver 46, the condition exists that the output voltage of amplifier 39 is balanced against the fall of potential in Z due to the output current of amplifier 38 and, hence, that $$\frac{k_1 k_2 k_3 j\omega M v_1}{r_p (R + r_{p2})} Z = k_1 k_4 (v_2 - v_1) \quad (9)$$

or $$\frac{v_2 - v_1}{v_1} = \frac{k_2 k_3}{k_4 r_p (R + r_{p2})} j\omega M Z \quad (10)$$

But from Equation (1)

$$\frac{v_2 - v_1}{v_1} = \frac{Z_1}{Z_s},$$

hence $$Z_1 = \frac{k_2 k_3}{k_4 r_p (R + r_{p2})} j\omega M Z_s Z \quad (11)$$

The impedance $Z_s$ of the spring is expressed in terms of its elasticity $s$ by $$Z_s = \frac{s}{j\omega}$$

Inserting this value in Equation (11) and combining the several constant factors into a single constant K, the equation becomes $$Z_1 = KZ \quad (12)$$

which states that the mechanical impedance on the driven side of the spring is directly proportional to the common electrical impedance Z.

The impedance Z is made up of a variable resistance $R_1$, a variable inductance $L_1$ and a variable capacity $C_1$, the capacity and the inductance preferably having short-circuiting switches 51 and 52 so that their impedances may be reduced to zero when desired.

When no load is attached to shaft 28 there is still an internal mechanical impedance $Z_m$ due to coil 14 and shaft 28. A zero setting $Z_o$ corresponding to this impedance $Z_m$ may be determined by a preliminary adjustment of impedance Z.

The value of the constant K may be determined by the following procedure:

A known mass $m_1$ is attached to shaft 28 and impedance Z is adjusted for balance, its adjusted value being denoted by $Z_a$. Then $$KZ_a = Z_m + j\omega m_1 \quad (13)$$

A different known mass $m_2$ is substituted for $m_1$ and the circuit is again balanced at the same frequency by adjusting Z to a second value denoted by $Z_b$. Then $$KZ_b = Z_m + j\omega m_2 \quad (14)$$

Subtracting Equation (13) from Equation (14) and solving for K, $$K = \frac{j\omega(m_2 - m_1)}{Z_a - Z_b} \quad (15)$$

In making an impedance measurement with the apparatus the desired frequency is set up on oscillator 33 and, with no load attached to shaft 28, a preliminary adjustment of the variable impedance Z is made in order to determine the zero setting, $Z_0$. The mechanical system to be measured is then attached securely to the free end of shaft 28 and a second adjustment of impedance Z is made, the adjusted value of Z being denoted by $Z_x$. If a mass reactance is being measured, condenser $C_1$ will be short-circuited by closing switch 51 and if an elastic reactance is being measured, inductance $L_1$ will be short-circuited by closing switch 52. When a balanced condition has been obtained no tone, or a minimum tone, will be heard in the telephone receiver 46. The mechanical impedance $Z_s$ of the system under measurement may now be obtained by subtracting the internal mechanical impedance $Z_m$ of the measuring apparatus from the total mechanical impedance on the driven side of the spring. In equation form, $$Z_s = K(Z_x - Z_0)$$

where K has the same value as in Equation (15).

The measuring apparatus will be most sensitive when measuring an impedance which has a value approximating that of the spring 13. A series of springs differing from each other in stiffness may be provided in order to facilitate the making of measurements over a wide frequency range. In making any particular measurement the spring chosen is the one whose impedance most nearly matches the mechanical impedance to be measured.

What is claimed is:

1. A device for measuring mechanical impedance comprising a source of vibratory motion, a deformable member connected to said source, means for connecting to said deformable member a device to be measured, said member being adapted to act as a deformable coupling between said source and the device to be tested, and means for comparing the velocity of the device under test with the difference between this velocity and the velocity of said source.

2. A device for measuring mechanical impedance comprising a source of vibratory motion, a deformable member connected to said source, means for connecting to said deformable member a device to be measured, said member being adapted to act as a deformable coupling between said source and the device to be tested, means for inducing electromotive forces proportional to the velocities of said source and the device to be tested, and means for balancing the electromotive force proportional to the velocity of the device under test against the difference of said induced electromotive forces.

3. A device for measuring mechanical impedance comprising a source of vibratory motion, a spring connected to said source, means for connecting to said spring a device to be measured, said spring being adapted to act as a coupling between said source and the device under test, and means for comparing the velocity of the device under test with the difference between this velocity and the velocity of said source.

4. A device for measuring mechanical impedance comprising a source of vibratory motion, a coupling of known finite impedance connected to said source, means for connecting to said coupling a piece of apparatus to be measured, the known impedance of said coupling having a value in the neighborhood of the impedance of said apparatus under test, and means for comparing the velocity of said apparatus under test with the difference between this velocity and the velocity of said source.

5. A device for measuring the mechanical impedance of a vibratory system, said device comprising a coil suspended in a steady magnetic field, a second coil suspended in a second steady magnetic field, a member of known finite mechanical impedance connecting said two coils, means for attaching said vibratory system to one of said coils, means for maintaining the other of said coils in vibratory motion and means for comparing the electromotive force generated in one of said coils with the difference between this electromotive force and the electromotive force generated in the other of said coils.

In witness whereof, I hereunto subscribe my name this 23rd day of November, 1931.

PAUL B. FLANDERS.